C. H. BACON.
Water-Meter.

No. 225,963           Patented Mar. 30, 1880.

Witnesses:
Frank G. Parker
C. H. Slade.

Inventor:
Charles Henry Bacon
by Maynadier Hoale
his attys.

UNITED STATES PATENT OFFICE.

CHARLES H. BACON, OF BOSTON, MASSACHUSETTS, ASSIGNOR OF ONE-HALF OF HIS RIGHT TO GEORGE A. WALKER, OF SAME PLACE.

WATER-METER.

SPECIFICATION forming part of Letters Patent No. 225,963, dated March 30, 1880.

Application filed June 9, 1879.

*To all whom it may concern:*

Be it known that I, CHARLES HENRY BACON, of Boston, in the county of Suffolk and State of Massachusetts, have invented a new Water-Meter, of which the following is a full, clear, concise, and exact description, reference being had to the accompanying drawings, in which—

Figure 1:
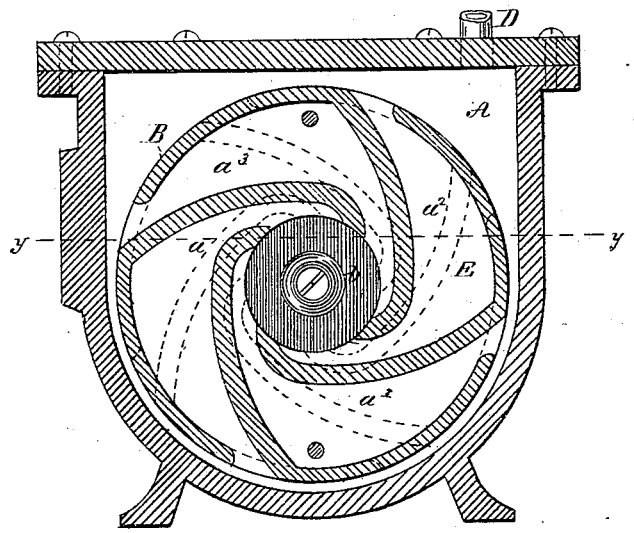
Figure 2:
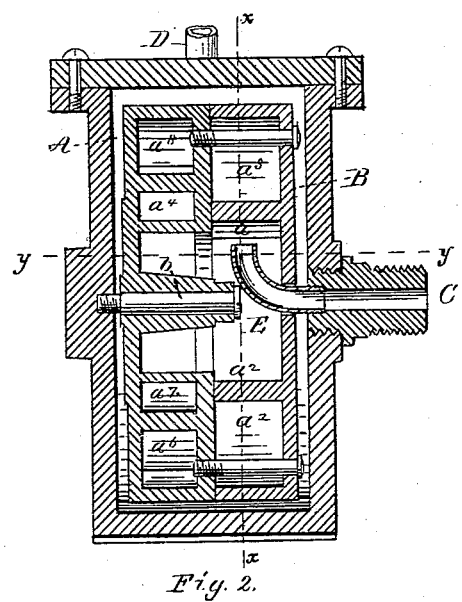
Figure 3:
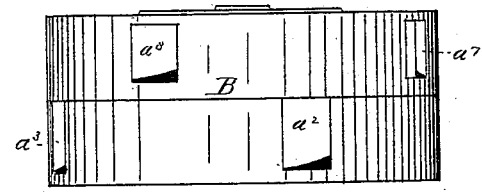

Figure 1 is a vertical lengthwise section on line $x\ x$ of Fig. 2, and Fig. 2 a vertical cross-section of a meter embodying my invention in the best form known to me. The other figures are details showing the measuring device.

The purpose of my invention is to provide a water-meter which is accurate, durable, simple in its construction, and not likely to get out of order.

My invention consists of the outer casing, A, containing mercury, the wheel B, having a hub, $b$, within a circular chamber concentric with the wheel, the wheel being composed of a series of measuring-chambers, $a\ a'\ a^2$, &c., each of which is open at the periphery of the wheel B, and also open at the periphery of the chamber around the hub $b$. This chamber is closed except sufficiently to admit the inlet-pipe C, as shown in Fig. 2, and this inlet-pipe C projects upward, so that its mouth is above the level of the mercury.

The wheel B, as will be seen, is free to rotate on a stud projecting from the interior of the reservoir A, and when the wheel B rotates the mercury contained in the chamber $a$, when the wheel is in the position shown in Fig. 1, will gradually escape as the wheel rotates, passing out of chamber $a$ through the aperture at the periphery of the wheel B, and so of all the other chambers, $a'\ a^2$, &c.

When the wheel B is in the position shown in Fig. 1 the water flowing through the pipe C will enter chamber $a$ through the aperture opening into the central chamber in wheel B, and fill chamber $a$ down to the level of the mercury; and as the wheel B rotates the water continues to flow from the central chamber in wheel B into chamber $a$ until the aperture leading from this central chamber in wheel B to chamber $a$ is closed by getting below the level of the mercury, (or in the place occupied by chamber $a^3$ in Fig. 1;) but when this inlet-aperture is thus closed by the mercury the outlet-aperture is above the level of the mercury, and the water in chamber $a$ therefore escapes into casing A, and flows out of that casing through outlet-pipe D.

When in use the casing A is filled up to line $y\ y$ with mercury, and above that line with water.

For the purpose of making a more steady flow the measuring device B is made double, as shown, the two sets of chambers being separated by a partition, and each chamber of one set has its inlet and outlet midway between the inlets and outlets of the two adjoining chambers of the other set.

The registering device I prefer to arrange inside the reservoir A, where it cannot be tampered with, the reservoir A being made in whole or in part of glass, so that the dial will be visible.

The meter will, of course, be made of some material not materially injured by the mercury or other fluid used. I prefer glass properly cased, to prevent accidental breaking; but cast-iron answers well, the rusting due to the presence of water being the only objection known to me, and that not a serious objection.

What I claim as my invention is—

The measuring device B, having two sets of chambers separated by a partition, and each chamber of one set between two chambers of the other set, each chamber opening at its inlet into a central space in B, and having its outlet at the periphery of B, substantially as described.

CHARLES HENRY BACON.

Witnesses:
C. H. SLADE,
GEORGE O. G. COALE.